United States Patent
Kakande

(10) Patent No.: US 9,762,452 B2
(45) Date of Patent: Sep. 12, 2017

(54) NETWORK SWITCH EMPLOYING ONE OR MORE MULTI-ENDPOINT OPTICAL TRANSCEIVERS

(71) Applicant: Alcatel-Lucent USA Inc., Murray Hill, NJ (US)

(72) Inventor: Joseph K. Kakande, Jersey City, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 85 days.

(21) Appl. No.: 14/872,837

(22) Filed: Oct. 1, 2015

(65) Prior Publication Data

US 2017/0099189 A1     Apr. 6, 2017

(51) Int. Cl.
G02F 1/00 (2006.01)
H04L 12/24 (2006.01)
H04Q 11/00 (2006.01)

(52) U.S. Cl.
CPC .......... *H04L 41/12* (2013.01); *H04L 41/0668* (2013.01); *H04L 41/0816* (2013.01); *H04L 41/0886* (2013.01); *H04Q 11/0066* (2013.01); *H04Q 2011/009* (2013.01); *H04Q 2011/0081* (2013.01)

(58) Field of Classification Search
CPC . H04L 41/12; H04L 41/0886; H04L 41/0668; H04L 41/0816; H04Q 11/0066; H04Q 2011/009; H04Q 2011/0081
USPC ............................................................ 398/5
See application file for complete search history.

(56) References Cited

U.S. PATENT DOCUMENTS

| | | |
|---|---|---|
| 6,963,575 B1 | 11/2005 | Sistanizadeh et al. |
| 7,643,468 B1 | 1/2010 | Arregoces et al. |
| 7,835,265 B2 | 11/2010 | Wang et al. |
| 8,654,630 B2 | 2/2014 | Lei et al. |
| 2010/0020806 A1 | 1/2010 | Vahdat et al. |
| 2012/0321309 A1 | 12/2012 | Barry et al. |
| 2014/0140689 A1 | 5/2014 | Dahlfort et al. |

OTHER PUBLICATIONS

Kakande, J., "Multiple Endpoint Optical Transmitter Cross Reference to Related Application," U.S. Appl. No. 14/728,915, filed Jun. 2, 2015, 32 pages.
Kakande, J., "Multiple Endpoint Optical Receiver Cross Reference to Related Application," U.S. Appl. No. 14/728,919, filed Jun. 2, 2015, 29 pages.

(Continued)

*Primary Examiner* — Juan A Torres
(74) *Attorney, Agent, or Firm* — Mendelsohn Dunleavy, P.C.; Yuri Gruzdkov

(57) ABSTRACT

A network switch having one or more multi-endpoint (MEP) optical transceivers configured to provide an interface for optical data transport through the corresponding network. The use of MEP optical transceivers advantageously enables the network switch to be compatible with multiple network topologies. As a result, various embodiments of the disclosed network switch may be used to provide a builder and/or an operator of the corresponding network with a great deal of flexibility in choosing a network topology and/or degree of redundancy better suitable for the network's intended purpose and/or application without having to change some of the underlying hardware.

20 Claims, 7 Drawing Sheets

(56) References Cited

OTHER PUBLICATIONS

Kakande, J., "Network Switch Employing One or More Multi-Endpoint Optical Transceivers," U.S. Appl. No. 14/872,825, filed Oct. 1, 2015, 29 pages.
Liu, Y., et al. "A Survey of Datacenter Network Architectures," Springer Book Brief 2013, pp. 1-22.
Bazzaz, H., et al. "Switching the optical divide: Fundamental challenges for hybrid electrical/optical datacenter networks." Proceedings of the 2nd ACM Symposium on Cloud Computing. ACM, 2011.
Saha, S., et al. "HyScaleII: A high performance hybrid optical network architecture for data centers." Sarnoff Symposium (Sarnoff), 2012 35th IEEE. IEEE, 2012.
Bilal, Kashif, et al. "A taxonomy and survey on green data center networks." Future Generation Computer Systems 36 (2014): 189-208.
Xia, Kang, et al. "Petabit optical switch for data center networks." Polytechnic Institute of New York University, New York, Tech. Rep (2010).

100

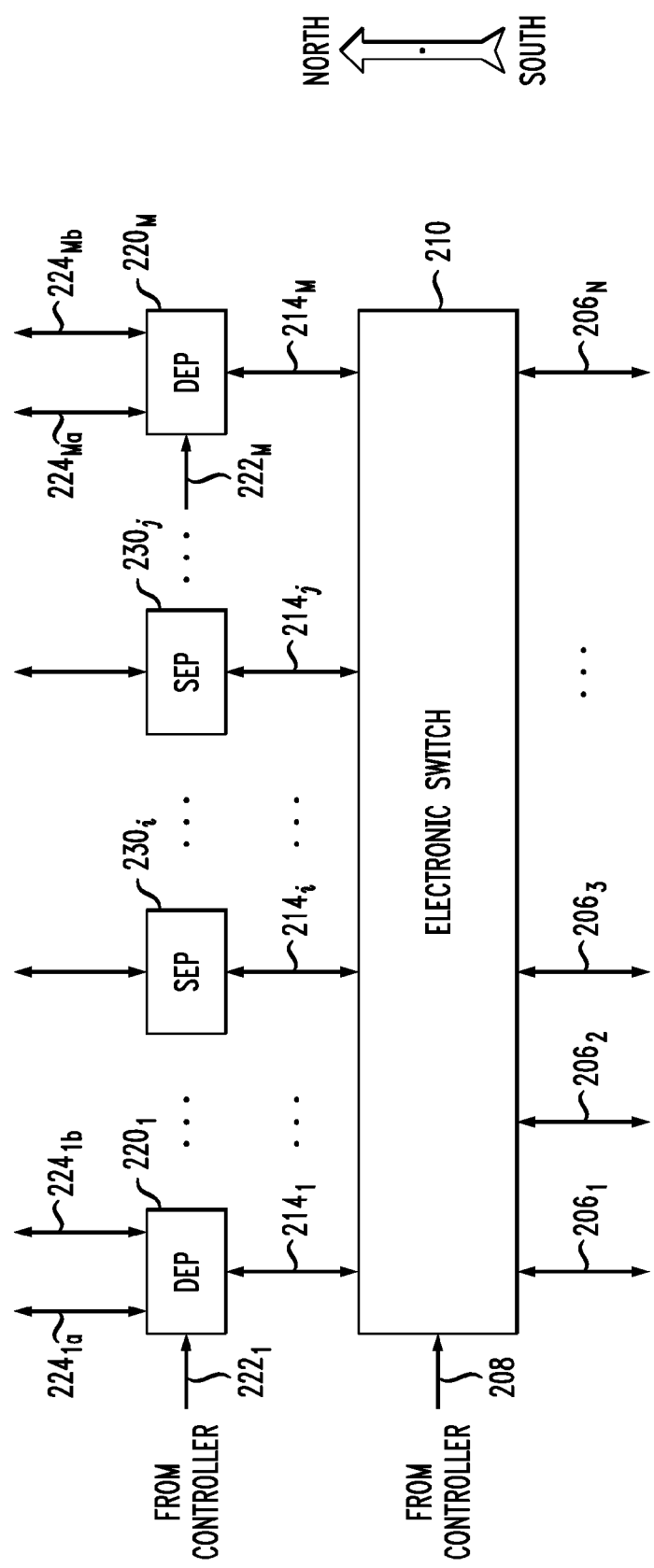

300

400

400

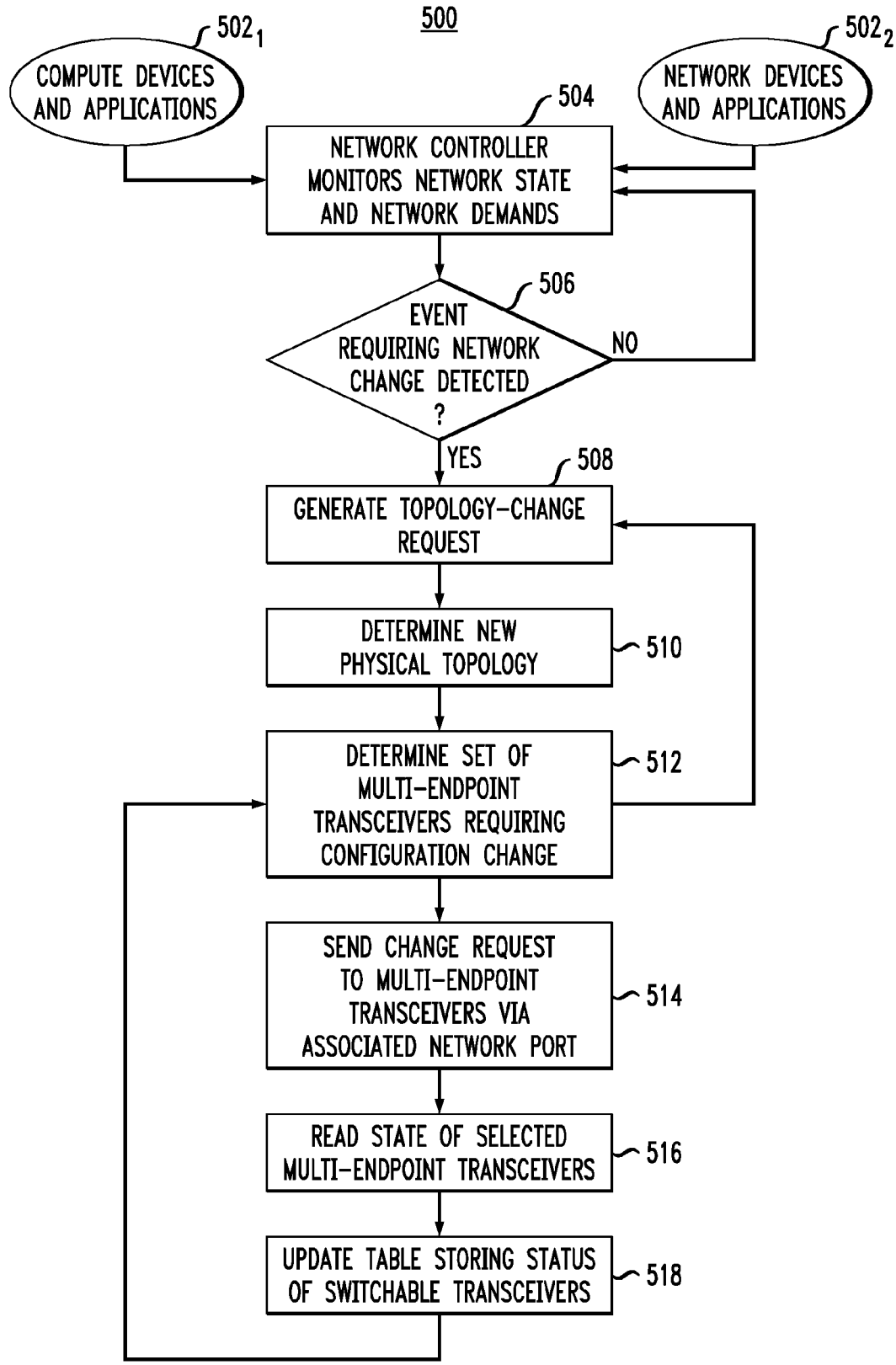

NETWORK SWITCH EMPLOYING ONE OR MORE MULTI-ENDPOINT OPTICAL TRANSCEIVERS

BACKGROUND

Field

The present disclosure relates to optical communication equipment and, more specifically but not exclusively, to network switches employing multi-endpoint (MEP) optical transceivers and to methods and apparatus for deploying, configuring, and operating the same.

Description of the Related Art

This section introduces aspects that may help facilitate a better understanding of the disclosure. Accordingly, the statements of this section are to be read in this light and are not to be understood as admissions about what is in the prior art or what is not in the prior art.

Network switches are often designed for a specific (e.g., fixed) network topology. However, different network topologies may be optimal for different network applications. Moreover, some topological adjustment or change may be desirable in a network after the initial network deployment and installation, e.g., due to repurposing or link failure. Hence, network switches that are suitable for use in different network topologies and/or have the capability of supporting a topological change without having to be replaced are desirable network-building components.

SUMMARY OF SOME SPECIFIC EMBODIMENTS

Disclosed herein are various embodiments of a network switch having one or more multi-endpoint (MEP) optical transceivers configured to provide an interface for optical data transport through the corresponding network. The use of MEP optical transceivers advantageously enables the network switch to be compatible with multiple network topologies. As a result, various embodiments of the disclosed network switch may be used to provide a builder and/or an operator of the corresponding network with a great deal of flexibility in choosing a network topology and/or degree of redundancy better suitable for the network's intended purpose and/or application without having to change some of the underlying hardware.

According to one embodiment, provided is an apparatus comprising: an electronic switch having a plurality of first electrical ports and a plurality of second electrical ports and configured to direct data between any of the first electrical ports and any of the second electrical ports; and a plurality of optical transceivers, each having an electrical port connected to a respective one of the second electrical ports of the electronic switch and configured to provide an interface for optical transport of data corresponding to the respective one of the second electrical ports. The plurality of optical transceivers comprises one or more MEP optical transceivers, each having a respective first optical port and a respective second optical port and configurable to transport the data corresponding to the respective one of the second electrical ports through a selected one of the respective first optical port and the respective second optical port.

According to another embodiment, provided is an apparatus comprising: a first network switch that includes a MEP optical transceiver having a first optical port optically coupled to a first optical path and a second optical port optically coupled to a second optical path; a second network switch optically coupled to the first optical path; and a third network switch optically coupled to the second optical path. The MEP optical transceiver is configurable to transport data through a selected one of the first optical port and the second optical port.

BRIEF DESCRIPTION OF THE DRAWINGS

Other aspects, features, and benefits of various disclosed embodiments will become more fully apparent, by way of example, from the following detailed description and the accompanying drawings, in which:

FIG. 2 shows a block-diagram of a network switch according to an embodiment of the disclosure;

FIG. 5 shows a flowchart of a method of configuring a communication network according to an embodiment of the disclosure.

DETAILED DESCRIPTION

Certain embodiments disclosed herein may benefit from the use of methods and apparatus disclosed in U.S. patent application Ser. No. 14/872,825, by Joseph Kakande, filed on the same date as the present application, which is incorporated herein by reference in its entirety.

Figure 1:
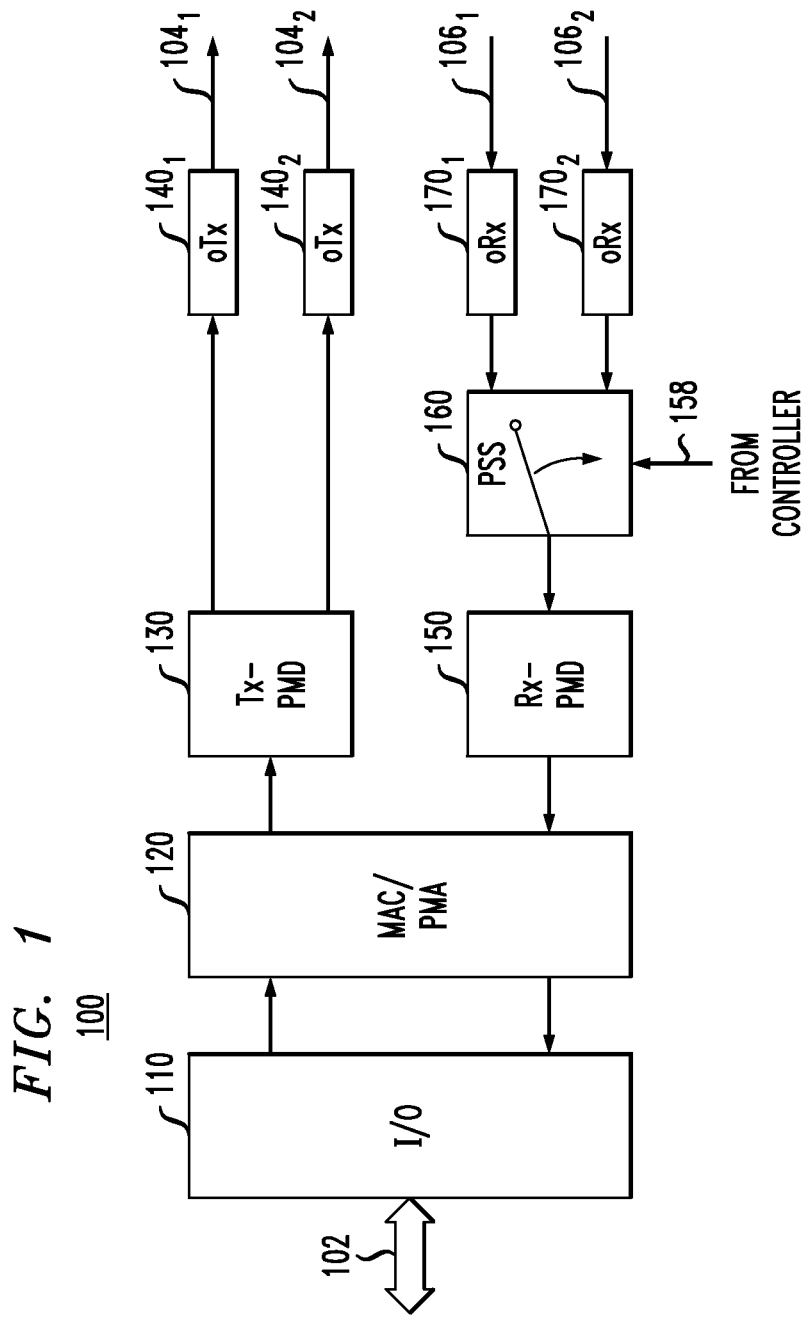
FIG. 1 shows a block diagram of a dual-endpoint transceiver that can be used in various embodiments disclosed herein.

FIG. 1 shows a block diagram of a dual-endpoint (DEP) optical transceiver 100 that can be used in various embodiments of the communication systems and devices disclosed herein. From the provided description, a person of ordinary skill in the art will understand that DEP optical transceiver 100 is an example of a multi-endpoint (MEP) optical transceiver that can be used in alternative embodiments instead of or in addition to DEP optical transceiver 100. Various additional embodiments of DEP optical transmitters, DEP optical receivers, MEP optical transmitters, and MEP optical receivers that can be employed in alternative embodiments of MEP and/or DEP optical transceivers suitable for use in communication systems and devices disclosed herein are described in more detail, e.g., in U.S. patent application Ser. Nos. 14/728,915 and 14/728,919, filed on Jun. 2, 2015, both of which are incorporated herein by reference in their entirety.

As explained in these patent applications, a difference between a MEP optical transceiver and a DEP optical transceiver may be in the number of optical ports. For example, as further explained below, a DEP optical transceiver has two optical input ports and two optical output ports. In contrast, a MEP optical transceiver may have N optical input ports and N optical output ports, where N is any positive integer greater than one. Therefore, a DEP optical transceiver can be considered as one possible embodiment of a MEP optical transceiver, in which N=2. For at least this reason, the term "MEP optical transceiver," as used in this specification and claims, should be construed as a more-general term that covers, inter alia, a DEP optical transceiver.

In an example embodiment, DEP optical transceiver 100 has an electrical input/output (I/O) port 102, optical output ports $104_1$ and $104_2$, and optical input ports $106_1$ and $106_2$.

An I/O interface 110 coupled between I/O port 102 and a MAC/PMA module 120 enables DEP optical transceiver 100 to send/receive data to/from external electrical circuits. MAC/PMA module 120 is further coupled, as indicated in FIG. 1, to PMD modules 130 and 150 located in the transmit chain and the receive chain, respectively, of DEP optical transceiver 100. The acronyms MAC, PMA, and PMD stand for media access control, physical medium attachment, and physical medium dependent, respectively.

In an example embodiment, the MAC function of MAC/PMA module 120 enables the addressing and channel-access control mechanisms of the MAC data-communication protocol employed in the corresponding communication system. A person of ordinary skill in the art will appreciate that MAC data-communication protocols define a MAC sub-layer of the data link layer (also often referred to as Layer 2 or L2) of the corresponding communication system. The hardware that implements the MAC functions may also be referred to as the media-access controller.

Together, MAC/PMA module 120 and PMD modules 130 and 150 may be configured to perform one or more of the following PMA/PMD functions:
(A) Clock and Data Recovery (CDR): the CDR function enables extraction of a clock tone from the incoming data signal to allow incoming symbols to be sampled at optimal time(s), e.g. near the middle of a symbol waveform, as well as to provide a reference clock for the digital circuitry configured to process the received signals;
(B) Deserializer/Serializer: this function enables conversion of multiple parallel data streams (e.g., as in four lanes of a 40GBASE-LR4 system) into a single serial data stream, and vice versa; and
(C) Physical Coding Sub-layer (PCS): this function enables extraction of protocol-specific data frames from the corresponding bit streams and may include frame re-alignment, removal of alignment data blocks/bits, descrambling, and decoding. A person of ordinary skill in the art will appreciate that the PCS-processed output can be forwarded to the data link layer.

The receive chain of DEP optical transceiver 100 also includes a path-select switch (PSS) 160 coupled between PMD module 150 and optical input ports $106_1$ and $106_2$ as indicated in FIG. 1. Switch 160 has two possible states, one of which can be controllably selected and enabled based on a control signal 158 received from an external (e.g., network) controller. For example, in a first state of switch 160, PMD module 150 may be electrically coupled to an optical receiver (oRx) $170_1$ and configured to process an electrical signal generated by that optical receiver in response to the optical signal received at optical input port $106_1$. In a second state of switch 160, PMD module 150 is similarly electrically coupled to an optical receiver (oRx) $170_2$ and configured to process an electrical signal generated by that optical receiver in response to the optical signal received at optical input port $106_2$. The presence of switch 160 enables DEP optical transceiver 100 to dynamically select from which one of optical input ports $106_1$ and $106_2$ to accept data. Possible beneficial uses of this particular capability of DEP optical transceiver 100 are described in more detail below in reference to FIGS. 2-5.

The transmit chain of DEP optical transceiver 100 includes optical transmitters (oTx's) $140_1$ and $140_2$ coupled between PMD module 130 and optical output ports $104_1$ and $104_2$ as indicated in FIG. 1. In operation, optical transmitters $140_1$ and $140_2$ generate optical signals carrying two copies of the same data for simultaneous transmission over the optical paths (e.g., optical fibers) coupled to optical output ports $104_1$ and $104_2$. Possible beneficial uses of this particular capability of DEP optical transceiver 100 are also described in more detail below in reference to FIGS. 2-5.

Additional benefits of DEP optical transceiver 100 arise from (i) the shared use of MAC/PMA module 120 and PMD module 130 by optical transmitters $140_1$ and $140_2$ and (ii) the shared use of PMD module 150 and MAC/PMA module 120 by optical receivers $170_1$ and $170_2$. These shared uses may result, for example, in a lower cost of DEP optical transceiver 100 compared to the cost of a functionally comparable optical transceiver composed of two conventional (e.g., single-endpoint, SEP) optical transmitters and two conventional (e.g., SEP) optical receivers.

As used herein, the term "endpoint" refers to a source and/or a sink of an optical signal. In an example embodiment, such an endpoint may include one or more of: (i) an electrical-to-optical (E/O) signal converter; (ii) an optical-to-electrical (O/E) signal converter; (iii) an optical modulator; (iv) an optical signal splitter; (v) an optical signal combiner; (vi) an optical hybrid; (vii) an optical local oscillator; and (viii) and optical and/or electrical signal processor. An example endpoint may be a conventional or MEP optical transceiver, an optical transmitter, or an optical receiver.

In general, a MEP optical transceiver can send and receive optical signals to/from multiple endpoints using the respective optical ports. However, at any given moment in time, a MEP optical transceiver can only accept optically carried data from a single endpoint because the use of a path-select switch (such as switch 160) in effect disables the non-selected optical ports by substantially preventing the corresponding electrical signals from reaching the backend electrical I/O port (such as I/O port 102) of the MEP optical transceiver. As already explained above, different optical ports of the MEP optical transceiver can be selected and enabled at different times. In contrast, a SEP optical transceiver, taken by itself, lacks the capability of selecting and/or switching endpoints and can only communicate with a single endpoint located at the remote end of the optical pathway (e.g., optical fiber) connected to its optical front end.

FIG. 2 shows a block-diagram of a network switch 200 according to an embodiment of the disclosure. Switch 200 may be used, e.g., in a network node, as further described below in reference to FIGS. 3-4. As will be clear from the provided examples, the use of one or more MEP optical transceivers in switch 200 enables the switch to be compatible with multiple network topologies, the nominal number of which depends on the number of MEP optical transceivers used in the switch. As a result, various embodiments of switch 200 can advantageously provide a builder and/or an operator of the corresponding network with a great deal of flexibility in choosing a network topology better suitable for the network's intended purpose and/or application without having to change some of the underlying hardware.

In an example embodiment, switch 200 includes an electronic switch 210 having a total of N+M ports. N of the N+M ports are configured as south ports $206_1$-$206_N$, and the remaining M of the N+M ports are configured as north ports $214_1$-$214_M$. In some embodiments, N=M. Representative values of N and M are 16, 32, 64, 128, etc. In some embodiments, the number of ports in switch 210 is not necessarily equal $2^n$, where n is a positive integer.

Switch 210 may be configured to switch traffic between south ports $206_1$-$206_N$ and north ports $214_1$-$214_M$. In an example configuration, each of south ports $206_1$-$206_N$ of switch 210 may be connected to a respective network host (e.g., a server), a respective node of a storage network, or a port of another (e.g., public) network, such as the Internet (none of which are explicitly shown in FIG. 2). Traffic switching between south ports 206$_1$-206$_N$ and north ports 214$_1$-214$_M$ of switch 210 can be controlled via a control signal 208 received, e.g., from an electronic network controller (not explicitly shown in FIG. 2). In some embodiments, switch 210 may be an electronic packet switch.

Each of north ports 214$_1$-214$_M$ of switch 210 is connected to a respective (SEP or MEP) optical transceiver as indicated in FIG. 2. In an example embodiment, switch 210 comprises at least one port 214 connected to a MEP optical transceiver, such as a DEP optical transceiver 220. In one example embodiment, DEP optical transceiver 220 may be an instance (nominal copy) of DEP optical transceiver 100 (FIG. 1). In some embodiments, the number of MEP optical transceivers in switch 200 is changeable, e.g., through a process of replacing a SEP optical transceiver 230 by a DEP optical transceiver 220, or vice versa.

The illustrative embodiment of switch 200 shown in FIG. 2 includes (i−1+M−j) DEP optical transceivers 220 and (j−i+1) SEP optical transceivers 230, where i and j are positive integers. More specifically, (i−1) DEP optical transceivers 220 are connected to north ports 214$_1$-214$_{i-1}$, respectively; and (M−j) DEP optical transceivers 220 are connected to north ports 214$_{j+1}$-214$_M$, respectively. The (j−i+1) SEP optical transceivers 230 are connected to north ports 214$_i$-214$_j$, respectively. For clarity of depiction, only two of the DEP optical transceivers (labeled 220$_1$ and 220$_M$) and only two of the SEP optical transceivers (labeled 230$_i$ and 230$_j$) are shown in FIG. 2. In some embodiments, north ports 214 connected to SEP optical transceivers 230 and DEP optical transceivers 220 may be block-interleaved or port-interleaved.

Endpoint selection for each of DEP optical transceiver 220 can be controlled via a respective control signal 222 received, e.g., from an electronic network controller (not explicitly shown in FIG. 2). For example, control signal 222$_1$ may be used to configure DEP optical transceiver 220$_1$ to establish a communication link and communicate with an endpoint (e.g., another optical transceiver, not explicitly shown in FIG. 2; see, e.g., FIG. 3A) connected to I/O optical port 224$_{1a}$ or with an endpoint connected to I/O optical port 224$_{1b}$. Similarly, control signal 222$_M$ may be used to configure DEP optical transceiver 220$_M$ to establish a communication link and communicate with an endpoint connected to I/O optical port 224$_{Ma}$ or with an endpoint connected to I/O optical port 224$_{Mb}$. In some embodiments, a control signal 222 comprises control signal 158 (FIG. 1); an I/O optical port 224$_{ma}$ comprises optical output port 104$_1$ and optical input port 106$_1$ (FIG. 1); and an I/O optical port 224$_{mb}$ comprises optical output port 104$_2$ and optical input port 106$_2$ (FIG. 1), where m is an index pointing to a particular DEP optical transceiver 220$_m$ in switch 200, wherein the value of the index m in the subscripts ma and mb can take (i−1+M−j) different integer values from the interval [1,M], each of these integer values pointing to the particular one of north ports 214$_1$-214$_m$ to which the corresponding DEP optical transceiver 220$_m$ is connected.

Figure 3A:
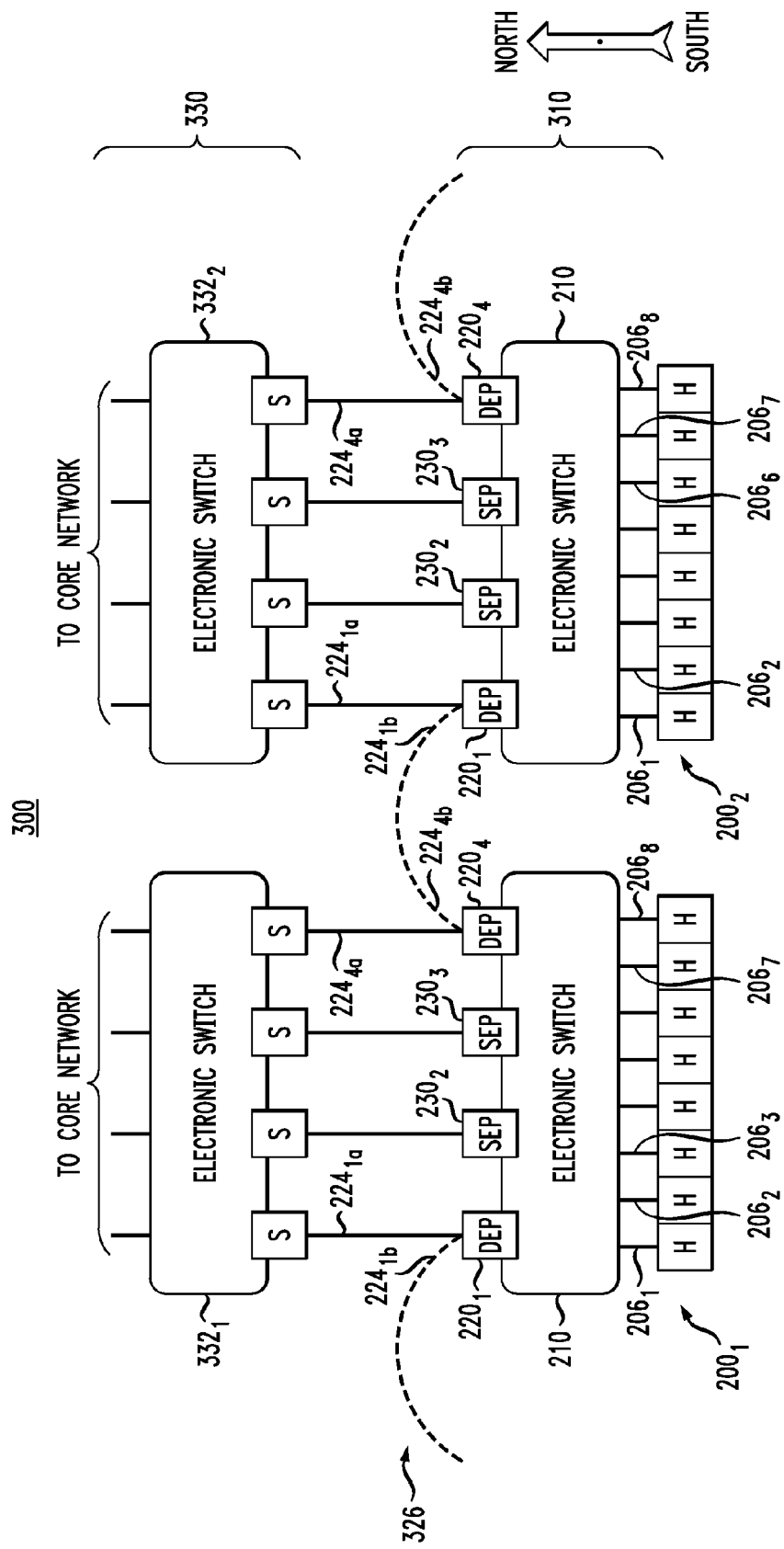
FIGS. 3A-3B show a block diagram of a communication network employing one or more switches of FIG. 2 according to an embodiment of the disclosure.
Figure 3B:
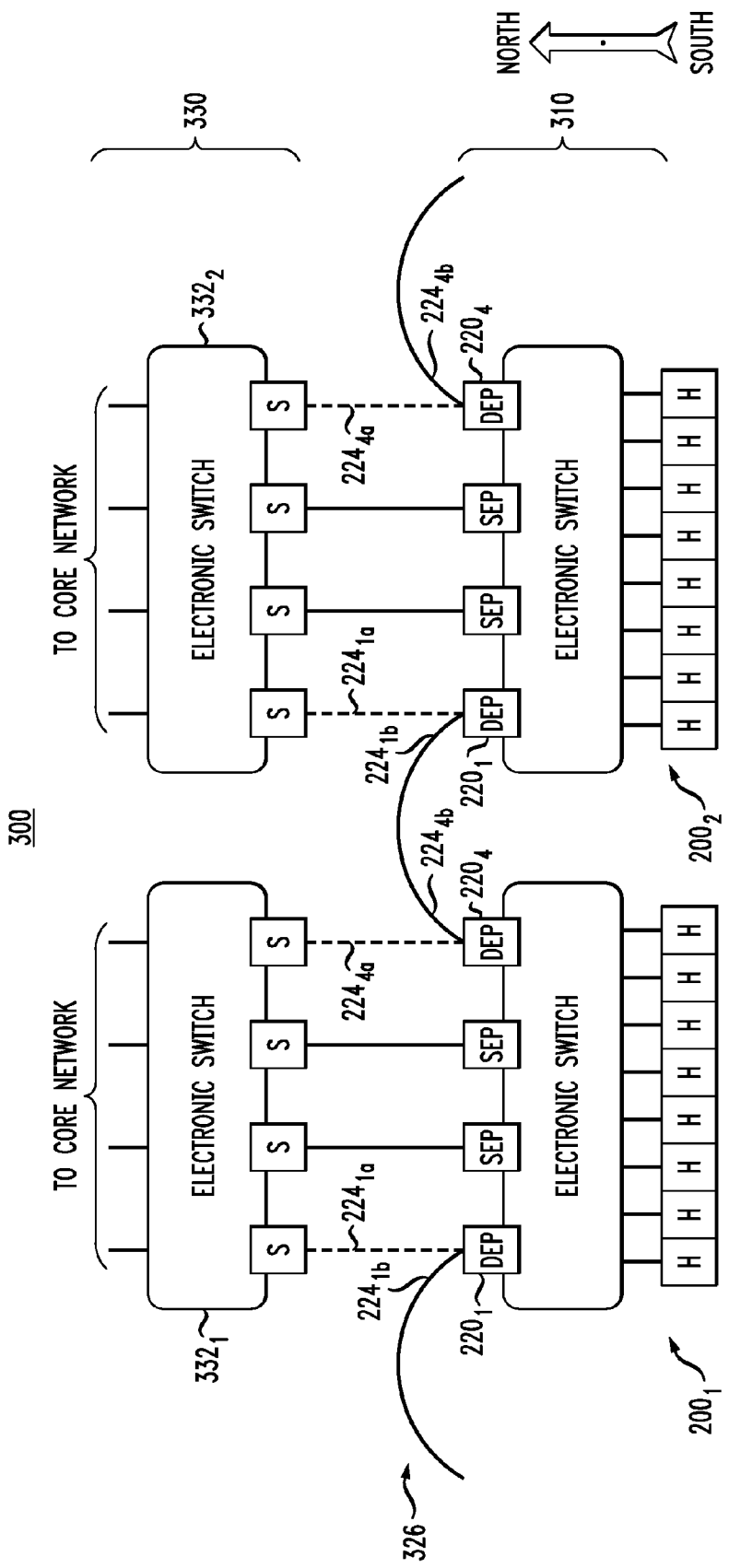

FIGS. 3A-3B show a block diagram of a communication network 300 employing switches 200 (FIG. 2) according to an embodiment of the disclosure. More specifically, FIG. 3A shows a first possible topology of network 300 enabled by the use therein of switches 200. FIG. 3B shows a second possible topology of network 300 similarly enabled by the use of switches 200. In some embodiments, a reconfiguration of network 300 from the first topology to the second topology, or vice versa, may be accomplished through a relatively fast and straightforward reconfiguration of DEP optical transceivers 220 using the respective control signals 222 (see FIG. 2).

Network 300 comprises two switches 200, labeled 200$_1$ and 200$_2$, respectively. Each of switches 200$_1$ and 200$_2$ is an embodiment of switch 200 (FIG. 2) corresponding to the following parameters: i=2; j=3; M=4; and N=8. South ports 206$_1$-206$_8$ of each of switches 200$_1$ and 200$_2$ are illustratively shown in FIG. 3 as being connected to a respective cluster of eight network hosts (e.g., servers) H.

In an example embodiment, network 300 is topologically organized using two layers: a leaf layer 310 and a spine layer 330. Leaf layer 310 includes switches 200$_1$ and 200$_2$. Spine layer 330 includes electronic switches 332$_1$ and 332$_2$. Electronic switches 332$_1$ and 332$_2$ are interconnected with switches 200$_1$ and 200$_2$, as indicated in FIGS. 3A-3B, using a plurality of SEP optical transceivers S and a plurality of optical paths (e.g., optical fibers) 326. Electronic switches 332$_1$ and 332$_2$ are further connected to the core network as further indicated in FIGS. 3A-3B.

The topology of network 300 shown in FIG. 3A can be obtained by configuring DEP optical transceivers 220 therein as follows: (i) DEP optical transceiver 220$_1$ in switch 200$_1$ is configured to establish a communication link via its I/O optical port 224$_{1a}$ and communicate with a transceiver S coupled to electronic switch 332$_1$; (ii) DEP optical transceiver 220$_4$ in switch 200$_1$ is configured to establish a communication link via its I/O optical port 224$_{4a}$ and communicate with another transceiver S coupled to electronic switch 332$_1$; (iii) DEP optical transceiver 220$_1$ in switch 200$_2$ is configured to establish a communication link via its I/O optical port 224$_{1a}$ and communicate with a transceiver S coupled to electronic switch 332$_2$; and (iv) DEP optical transceiver 220$_4$ in switch 200$_2$ is configured to establish a communication link via its I/O optical port 224$_{4a}$ and communicate with another transceiver S coupled to electronic switch 332$_2$. Note that, in this configuration, the following I/O optical ports of DEP optical transceivers 220 are disabled: (i) I/O optical port 224$_{1b}$ of DEP optical transceiver 220$_1$ in switch 200$_1$; (ii) I/O optical port 224$_{4b}$ of DEP optical transceiver 220$_4$ in switch 200$_1$; (iii) I/O optical port 224$_{1b}$ of DEP optical transceiver 220$_1$ in switch 200$_2$; and (iv) I/O optical port 224$_{4b}$ of DEP optical transceiver 220$_4$ in switch 200$_2$. In operation, the disabled I/O ports may not accept any communication signals through the optical fibers 326 connected to these disabled I/O optical ports, which is indicated in FIG. 3A by the dashed lines depicting those optical fibers. In some embodiments, optical signals may still be transmitted through multiple optical output ports (such as 104, FIG. 1), and potentially received at the remote end(s) of the corresponding links. However, some of those received optical signals may then be discarded thereat, e.g., as not being intended for that particular destination.

The topology of network 300 shown in FIG. 3B can be obtained by configuring DEP optical transceivers 220 therein as follows: (i) DEP optical transceiver 220$_1$ in switch 200$_1$ is configured to establish a communication link via its I/O optical port 224$_{1b}$ and communicate with an optical transceiver (not explicitly shown in FIG. 3B) connected to the remote end of the corresponding optical fiber 326; (ii) DEP optical transceiver 220$_4$ in switch 200$_1$ is configured to establish a communication link via its I/O optical port 224$_{4b}$ and communicate with DEP optical transceiver 220$_1$ in switch 200$_2$; (iii) DEP optical transceiver 220$_1$ in switch 200$_2$ is configured to establish a communication link via its I/O optical port $224_{1b}$ and communicate with DEP optical transceiver $220_4$ in switch $200_1$; and (iv) DEP optical transceiver $220_4$ in switch $200_2$ is configured to establish a communication link via its I/O optical port $224_{4b}$ and communicate with an optical transceiver (not explicitly shown in FIG. 3B) connected to the remote end of the corresponding optical fiber 326. Note that, in this configuration, the following I/O optical ports of DEP optical transceivers 220 are disabled: (i) I/O optical port $224_{1a}$ of DEP optical transceiver $220_1$ in switch $200_1$; (ii) I/O optical port $224_{4a}$ of DEP optical transceiver $220_4$ in switch $200_1$; (iii) I/O optical port $224_{1a}$ of DEP optical transceiver $220_1$ in switch $200_2$; and (iv) I/O optical port $224_{4a}$ of DEP optical transceiver $220_4$ in switch $200_2$. In operation, the disabled I/O ports do not transmit/accept any communication signals through the optical fibers 326 connected to these disabled I/O optical ports, which is indicated in FIG. 3B by the dashed lines depicting those optical fibers.

Comparison of the network topologies shown in FIGS. 3A and 3B reveals the following features. The network topology of FIG. 3A allocates all of its pertinent resources to the North-South traffic between leaf layer 310 and spine layer 330. The communication conduits for the East-West traffic within leaf layer 310 are disabled. In contrast, the network topology of FIG. 3B allocates only some of its pertinent resources to the North-South traffic between leaf layer 310 and spine layer 330. More specifically, DEP optical transceivers $220_1$ and $220_4$ in both switches $200_1$ and $200_2$ are not used to transmit any North-South traffic between leaf layer 310 and spine layer 330. Instead, DEP optical transceivers $220_1$ and $220_4$ are used to transmit East-West traffic within leaf layer 310. The network topology of FIG. 3B may provide a higher effective data throughput compared to the network topology of FIG. 3A, e.g., when network 300 experiences a traffic pattern in which a substantial traffic component carries the East-West traffic.

Reconfiguration of network 300 between the first network topology (FIG. 3A) and the second network topology (FIG. 3B) can advantageously be carried out using relatively straightforward commands issued by the network controller and applied to DEP optical transceivers $220_1$ and $220_4$ via control signals 222 (see FIG. 2). This capability is beneficial, e.g., because these topological changes may not require any hardware replacements and may be carried out in their entirety using software only.

In some embodiments, network 300 may be used to implement a data center. As used herein, the term "data center" refers to a pool of resources (e.g., computational, storage, communication) interconnected using a communication network. In some embodiments, some or each of DEP optical transceivers 220 may be implemented using a corresponding instance (e.g., a nominal copy) of DEP optical transceiver 100 (FIG. 1). In some other embodiments, some or each of DEP optical transceivers 220 may be implemented using a corresponding instance of a MEP optical transceiver built using the DEP/MEP optical transceiver components disclosed in the above-cited in U.S. patent application Ser. Nos. 14/728,915 and 14/728,919.

Example uses in a data center of a network topology compatible with the network topology of FIG. 3A are disclosed, e.g., in U.S. Patent Application Publication No. 2010/0020806, which is incorporated herein by reference in its entirety. Example uses in a data center of a network topology compatible with the network topology of FIG. 3B are disclosed, e.g., in U.S. Patent Application Publication No. 2012/0321309, which is also incorporated herein by reference in its entirety.

Figure 4A:
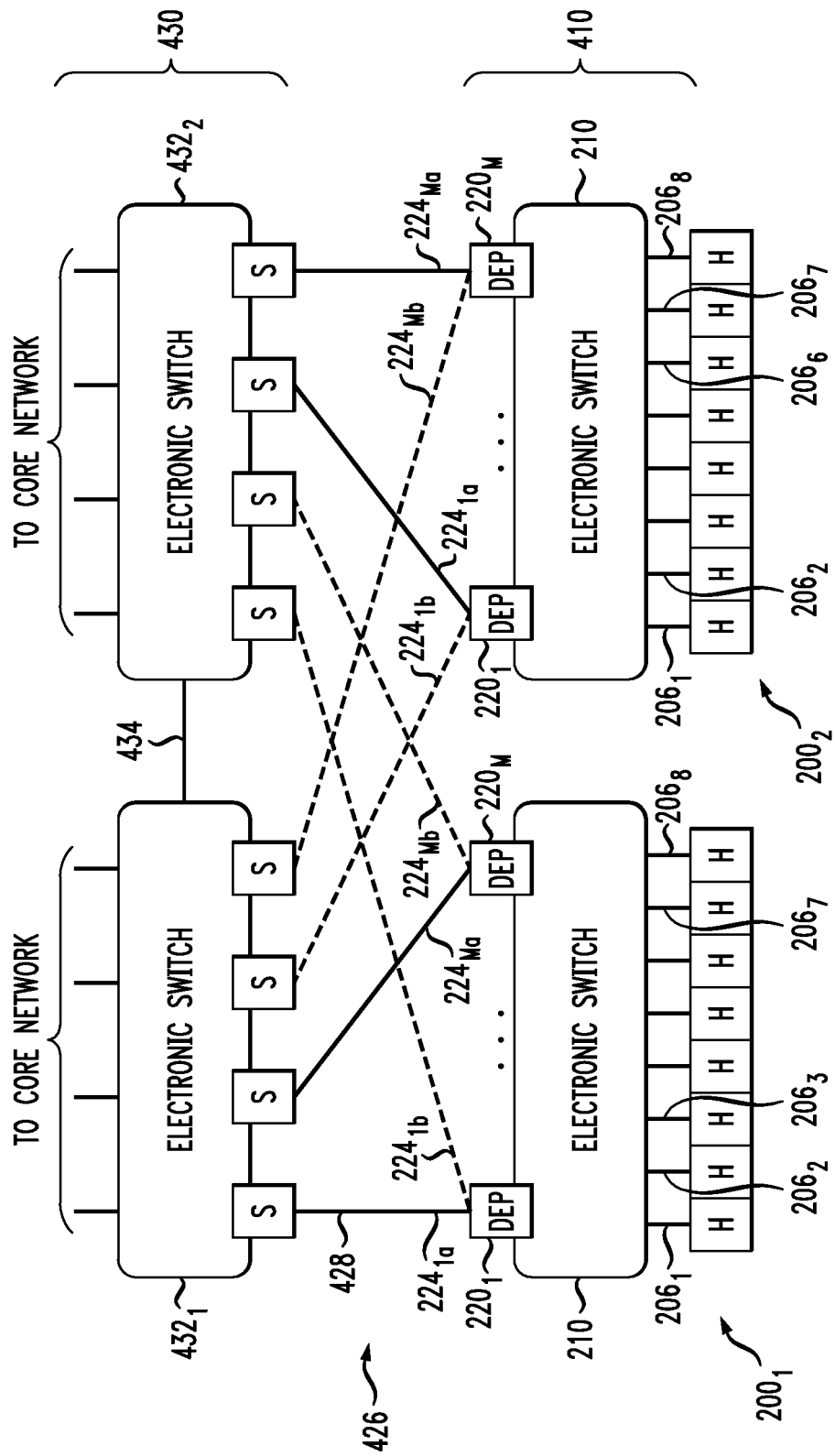
FIGS. 4A-4B show a block diagram of a communication network employing one or more switches of FIG. 2 according to another embodiment of the disclosure.
Figure 4B:
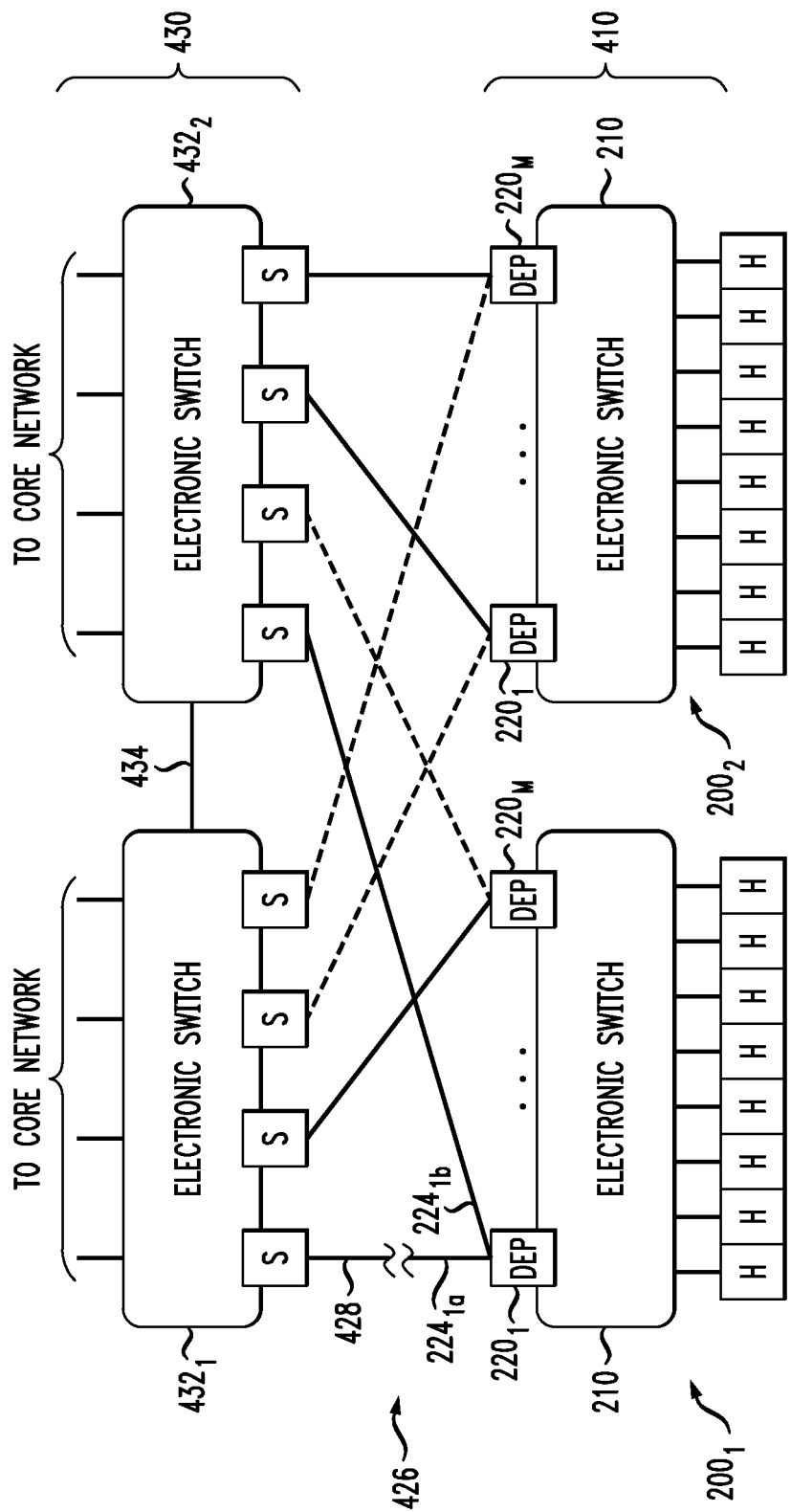

FIGS. 4A-4B show a block diagram of a communication network 400 employing switches 200 (FIG. 2) according to another embodiment of the disclosure. More specifically, FIGS. 4A-4B illustrate link redundancy in network 400 enabled by the use therein of switches 200, with FIG. 4A illustrating normal operation of the network, and FIG. 4B illustrating the use of redundant capabilities to bypass a failed link. In some embodiments, a reconfiguration of network 400 to bypass the failed link may be accomplished through a relatively fast and straightforward reconfiguration of DEP optical transceivers 220 using the respective control signals 222 (see FIG. 2).

Network 400 comprises two switches 200, labeled $200_1$ and $200_2$, respectively. Each of switches $200_1$ and $200_2$ is an embodiment of switch 200 (FIG. 2), wherein N=8. For clarity of depiction, SEP optical transceivers 230 are not shown in FIGS. 4A-4B. South ports $206_1$-$206_8$ of each of switches $200_1$ and $200_2$ are illustratively shown in FIGS. 4A-4B as being connected to a respective cluster of eight network hosts (e.g., servers) H.

In an example embodiment, network 400 is topologically organized using two layers: a distribution layer 410 and an aggregation layer 430. Distribution layer 410 includes switches $200_1$ and $200_2$. Aggregation layer 430 includes electronic switches $432_1$ and $432_2$. Electronic switches $432_1$ and $432_2$ are interconnected with switches $200_1$ and $200_2$, as indicated in FIGS. 4A-4B, using a plurality of SEP optical transceivers S and a plurality of optical paths (e.g., optical fibers) 426. Electronic switches $432_1$ and $432_2$ are connected to each other using a communication path 434 and are further connected to the core network as indicated in FIGS. 4A-4B. In various embodiments, communication path 434 may be an electrical path, an optical path, a wireless pass, or any combination thereof.

During normal operation of network 400 illustrated in FIG. 4A, the DEP optical transceivers 220 therein are configured as follows: (i) DEP optical transceiver $220_1$ in switch $200_1$ is configured to establish a communication link via its I/O optical port $224_{1a}$ and communicate with a transceiver S coupled to electronic switch $432_1$; (ii) DEP optical transceiver $220_M$ in switch $200_1$ is configured to establish a communication link via its I/O optical port $224_{Ma}$ and communicate with another transceiver S coupled to electronic switch $432_1$; (iii) DEP optical transceiver $220_1$ in switch $200_2$ is configured to establish a communication link via its I/O optical port $224_{1a}$ and communicate with a transceiver S coupled to electronic switch $432_2$; and (iv) DEP optical transceiver $220_M$ in switch $200_2$ is configured to establish a communication link via its I/O optical port $224_{Ma}$ and communicate with another transceiver S coupled to electronic switch $432_2$. Note that, in this configuration, the following I/O optical ports of DEP optical transceivers 220 are disabled: (i) I/O optical port $224_{1b}$ of DEP optical transceiver $220_1$ in switch $200_1$; (ii) I/O optical port $224_{Mb}$ of DEP optical transceiver $220_M$ in switch $200_1$; (iii) I/O optical port $224_{1b}$ of DEP optical transceiver $220_1$ in switch $200_2$; and (iv) I/O optical port $224_{Mb}$ of DEP optical transceiver $220_M$ in switch $200_2$. In operation, the disabled I/O ports may not transmit/accept any communication signals through the optical fibers 426 connected to these disabled I/O optical ports, which is indicated in FIG. 4A by the dashed lines depicting those optical fibers.

FIG. 4B shows operation of network 400 after one of the optical paths 426 (labeled 428) fails. This failure is indicated by the physical break or gap in optical path 428 in FIG. 4B. Despite the failure, network 400 is able to maintain its functionality by reconfiguring DEP optical transceiver $220_1$ in switch $200_1$. This reconfiguration includes disabling its I/O optical port $224_{1a}$ and, instead, enabling its I/O optical port $224_{1b}$. As a result, the traffic handled by DEP optical transceiver $220_1$ in switch $200_1$ is able to bypass the failed optical path 428 by being directed to a SEP optical transceiver S coupled to electronic switch $432_2$. Depending on the destination of any particular packet or flow, electronic switch $432_2$ may then direct that packet or flow directly to the core network or back to electronic switch $432_1$ via communication path 434.

A person of ordinary skill in the art will understand that similar reconfigurations of network 400 may also be performed using any of the other DEP optical transceivers 220 in distribution layer 410 in case of failure of any of the corresponding optical paths 426.

When desirable or necessary, additional redundancy may be obtained in some embodiments of network 400 by replacing some or all of the switches used in aggregation layer 430 by additional instances of switch 200.

FIG. 5 shows a flowchart of a method 500 of (re) configuring a communication network, e.g., network 300 (FIG. 3) or 400 (FIG. 4), according to an embodiment of the disclosure.

At steps $502_1$ and $502_2$ of method 500, various network entities send relevant information to a network controller regarding their operation, configuration, etc. For example, at step $502_1$, compute devices, such as servers H (see, e.g., FIGS. 3-4), and various applications run on the compute devices may report to the network controller the relevant parameters of their operation, configuration, etc. Similarly, at step $502_2$, network devices, such as switches 200, 332, and 432 and optical transceivers 220, 230, and S (see, e.g., FIGS. 3-4), and various applications run on the network devices may report to the network controller the relevant parameters of their operation, configuration, etc.

At step 504, the network controller processes the received reports to assess and monitor the current state of the corresponding network, such as network 300 (FIGS. 3A-3B) or network 400 (FIGS. 4A-4B). During said processing, the various reported parameters and additional parameters derived from the reported parameters may be compared with the corresponding reference and/or benchmark values stored in the memory to quantify the state of the network and the network demands.

At step 506, the network controller may detect, based on the results of step 504, a trigger event that calls for a reconfiguration of the network. Such a trigger event may be, for example, a physical link failure, as indicated in FIG. 4B. Another example of a trigger event may be the detection of a persistent traffic pattern that would benefit from a topological change, such as that indicated in FIGS. 3A-3B. Other trigger events are also possible. If a trigger event is detected, then the processing of method 500 is directed to step 508. Otherwise, the processing of method 500 is looped back to step 504.

At step 508, the network controller generates a topology-change request. Specifics of this request may depend on the type, characteristics, and/or physical location of the trigger event detected at step 506.

At step 510, the network controller determines a possible new physical topology of the network corresponding to the topology-change request of step 508.

At step 512, the network controller identifies a set of MEP optical transceivers (e.g., DEP optical transceivers 220) in the network that need a configuration change based on the possible new topology determined at step 510.

At step 514, the network controller sends a configuration-change request to the set of MEP optical transceivers identified at step 512.

At step 516, the network controller receives a configuration report from the MEP optical transceivers in response to the configuration-change request of step 514. Some configuration reports may contain a confirmation of the configuration change, while some others may contain respective error messages.

At step 518, the network controller updates, based on the configuration reports of step 516, the table that stores data about the current configuration state of the MEP optical transceivers.

If one or more error messages were generated and received at step 516, the network controller may repeat the processing of steps 508-518, e.g., as indicated by the loop-back arrows in FIG. 5, to achieve an error-free status for the topology change.

According to an example embodiment disclosed above in reference to FIGS. 1-5, provided is an apparatus comprising: an electronic switch (e.g., 210, FIG. 2) having a plurality of first electrical ports (e.g., 206, FIG. 2) and a plurality of second electrical ports (e.g., 214, FIG. 2) and configured to direct data between any of the first electrical ports and any of the second electrical ports; and a plurality of optical transceivers (e.g., 220, 230, FIG. 2), each having an electrical port (e.g., 102, FIG. 1) connected to a respective one of the second electrical ports of the electronic switch and configured to provide an interface for optical transport of data corresponding to the respective one of the second electrical ports. The plurality of optical transceivers comprises one or more multiple-endpoint (MEP) optical transceivers (e.g., 220, FIG. 2), each having a respective first optical port (e.g., $224_{ma}$, FIG. 2) and a respective second optical port (e.g., $224_{mb}$, FIG. 2) and configurable to transport the data corresponding to the respective one of the second electrical ports through a selected one of the respective first optical port and the respective second optical port.

In some embodiments of the above apparatus, the plurality of optical transceivers comprises two or more MEP optical transceivers (e.g., $220_1$ and $220_M$, FIG. 2).

In some embodiments of any of the above apparatus, at least some of the one or more MEP optical transceivers comprise respective dual-endpoint (DEP) optical transceivers (e.g., 100, FIG. 1).

In some embodiments of any of the above apparatus, each of the MEP optical transceivers is configured to: optically transmit a first copy of data to be transmitted via the respective first optical port; and optically transmit a second copy of the data to be transmitted via the respective second optical port.

In some embodiments of any of the above apparatus, each of the MEP optical transceivers comprises a respective path-select switch (e.g., 160, FIG. 1) configurable to cause the MEP optical transceiver to accept data optically received through the selected one of the respective first optical port and the respective second optical port.

In some embodiments of any of the above apparatus, the respective path-select switch is configured to cause the MEP optical transceiver not to accept data optically received via a non-selected one of the respective first optical port and the respective second optical port.

In some embodiments of any of the above apparatus, the plurality of optical transceivers comprises one or more single-endpoint (SEP) optical transceivers (e.g., 230, FIG. 2).

In some embodiments of any of the above apparatus, each of at least some of the one or more SEP optical transceivers is replaceable by a respective additional MEP optical transceiver.

In some embodiments of any of the above apparatus, the apparatus further comprises a cluster of network hosts (e.g., H, FIGS. 3-4), each coupled to a respective one of the first electrical ports of the electronic switch.

In some embodiments of any of the above apparatus, the apparatus further comprises an electronic controller operatively coupled (e.g., via 222, FIG. 2) to the one or more MEP optical transceivers to cause each of the one or more MEP optical transceivers to controllably select one of the respective first optical port and the respective second optical port.

In some embodiments of any of the above apparatus, the electronic controller is configured to cause each of the one or more MEP optical transceivers to change the selected one of the respective first optical port and the respective second optical port based on a topology-change request (e.g., as indicated by 508-518, FIG. 5).

According to another example embodiment disclosed above in reference to FIGS. 1-5, provided is an apparatus comprising: a first network switch (e.g., $200_1$ or $200_4$, FIGS. 3-4) that includes a multiple-endpoint (MEP) optical transceiver (e.g., $220_1$ or $220_4$, FIGS. 3-4) having a first optical port (e.g., $224_{1a}$, FIGS. 3-4) optically coupled to a first optical path and a second optical port (e.g., $224_{1b}$ or $224_{4b}$, FIGS. 3-4) optically coupled to a second optical path; a second network switch (e.g., $332_1$ and S, FIGS. 3-4) optically coupled to the first optical path; and a third network switch (e.g., $200_2$, FIG. 3, or $332_2$ and S, FIG. 4) optically coupled to the second optical path. The MEP optical transceiver is configurable to transport data through a selected one of the first optical port and the second optical port.

In some embodiments of the above apparatus, the MEP optical transceiver comprises a dual-endpoint (DEP) optical transceiver (e.g., 100, FIG. 1).

In some embodiments of any of the above apparatus, the apparatus further comprises an electronic controller operatively coupled (e.g., via 222, FIG. 2) to the MEP optical transceiver to cause the MEP optical transceiver to controllably select one of the first optical port and the second optical port.

In some embodiments of any of the above apparatus, the electronic controller is configured to cause the MEP optical transceiver to change the selected one of the first optical port and the respective second optical port based on a topology-change request (e.g., as indicated by 508-518, FIG. 5).

In some embodiments of any of the above apparatus, in a first configuration (e.g., FIG. 3A or FIG. 4A), the first network switch is configured to optically exchange data with the second network switch via the first optical path, but not with the third network switch via the second optical path; and in a second configuration (e.g., FIG. 3B or FIG. 4B), the first network switch is configured to optically exchange data with the third network switch via the second optical path, but not with the second network switch via the first optical path.

In some embodiments of any of the above apparatus, the apparatus further comprises an electronic controller operatively coupled (e.g., via 222, FIG. 2) to the first network switch and configured to cause the first network switch to transition between the first configuration and the second configuration in response to a trigger event (e.g., detected at 506, FIG. 5).

In some embodiments of any of the above apparatus, the trigger event comprises a physical failure in the first optical path (e.g., as indicated in FIG. 4B).

In some embodiments of any of the above apparatus, the trigger event comprises detection, in the first configuration, of a traffic pattern whose effective data throughput is greater in the second configuration than in the first configuration (as explained in reference to FIG. 3B).

In some embodiments of any of the above apparatus, in the second configuration, the third network switch is further configured to exchange data with the second network switch via an additional communication path (e.g., 434, FIGS. 4A-4B) that does not include any of the first and second optical paths.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments can be embodied in the form of program code recorded in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, processor, or controller, the machine becomes an apparatus for practicing the corresponding embodiment of the claimed invention(s).

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

What is claimed is:

1. An apparatus comprising:
 an electronic switch having a plurality of first electrical ports and a plurality of second electrical ports and configured to direct data between any of the first electrical ports and any of the second electrical ports; and
 a plurality of optical transceivers, each having an electrical port connected to a respective one of the second electrical ports of the electronic switch and configured to provide an interface for optical transport of data corresponding to the respective one of the second electrical ports; and
 wherein the plurality of optical transceivers comprises one or more multiple-endpoint (MEP) optical transceivers, each having a respective first optical port and a respective second optical port and configurable to transport the data corresponding to the respective one of the second electrical ports through a selected one of the respective first optical port and the respective second optical port.

2. The apparatus of claim 1, wherein the plurality of optical transceivers comprises two or more MEP optical transceivers.

3. The apparatus of claim 1, wherein at least some of the one or more MEP optical transceivers comprise respective dual-endpoint (DEP) optical transceivers.

4. The apparatus of claim 1, wherein each of the MEP optical transceivers is configured to:
 optically transmit a first copy of data to be transmitted via the respective first optical port; and
 optically transmit a second copy of the data to be transmitted via the respective second optical port.

5. The apparatus of claim 1, wherein each of the MEP optical transceivers comprises a respective path-select switch configurable to cause the MEP optical transceiver to accept data optically received through the selected one of the respective first optical port and the respective second optical port.

6. The apparatus of claim 5, wherein the respective path-select switch is configured to cause the MEP optical transceiver not to accept data optically received via a non-selected one of the respective first optical port and the respective second optical port.

7. The apparatus of claim 1, wherein the plurality of optical transceivers comprises one or more single-endpoint (SEP) optical transceivers.

8. The apparatus of claim 7, wherein each of at least some of the one or more SEP optical transceivers is replaceable by a respective additional MEP optical transceiver.

9. The apparatus of claim 1, further comprising a cluster of network hosts, each coupled to a respective one of the first electrical ports of the electronic switch.

10. The apparatus of claim 1, further comprising an electronic controller operatively coupled to the one or more MEP optical transceivers to cause each of the one or more MEP optical transceivers to controllably select one of the respective first optical port and the respective second optical port.

11. The apparatus of claim 10, wherein the electronic controller is configured to cause each of the one or more MEP optical transceivers to change the selected one of the respective first optical port and the respective second optical port based on a topology-change request.

12. An apparatus comprising:
 a first network switch that includes a multiple-endpoint (MEP) optical transceiver having a first optical port optically coupled to a first optical path and a second optical port optically coupled to a second optical path;
 a second network switch optically coupled to the first optical path; and
 a third network switch optically coupled to the second optical path; and
 wherein the MEP optical transceiver is configurable to transport data through a selected one of the first optical port and the second optical port.

13. The apparatus of claim 12, wherein the MEP optical transceiver comprises a dual-endpoint (DEP) optical transceiver.

14. The apparatus of claim 12, further comprising an electronic controller operatively coupled to the MEP optical transceiver to cause the MEP optical transceiver to controllably select one of the first optical port and the second optical port.

15. The apparatus of claim 14, wherein the electronic controller is configured to cause the MEP optical transceiver to change the selected one of the first optical port and the respective second optical port based on a topology-change request.

16. The apparatus of claim 12, wherein:
 in a first configuration, the first network switch is configured to optically exchange data with the second network switch via the first optical path, but not with the third network switch via the second optical path; and
 in a second configuration, the first network switch is configured to optically exchange data with the third network switch via the second optical path, but not with the second network switch via the first optical path.

17. The apparatus of claim 16, further comprising an electronic controller operatively coupled to the first network switch and configured to cause the first network switch to transition between the first configuration and the second configuration in response to a trigger event.

18. The apparatus of claim 17, wherein the trigger event comprises an occurrence of a physical failure in the first optical path.

19. The apparatus of claim 17, wherein the trigger event comprises detection, in the first configuration, of a traffic pattern whose effective data throughput is greater in the second configuration than in the first configuration.

20. The apparatus of claim 16, wherein:
 in the second configuration, the third network switch is further configured to exchange data with the second network switch via an additional communication path that does not include any of the first and second optical paths.

* * * * *